United States Patent
Speight

(10) Patent No.: US 11,050,671 B2
(45) Date of Patent: Jun. 29, 2021

(54) MOBILE WIRELESS COMMUNICATION UNIT AND METHOD FOR CONTENT TRANSFER

(71) Applicant: Veea Systems Ltd., Bath (GB)

(72) Inventor: Timothy James Speight, Monmouthshire South Wales (GB)

(73) Assignee: Veea Systems Ltd., Bath (GB)

(*) Notice: Subject to any disclaimer, the term of this patent is extended or adjusted under 35 U.S.C. 154(b) by 0 days.

(21) Appl. No.: 15/616,281

(22) Filed: Jun. 7, 2017

(65) Prior Publication Data

US 2017/0373979 A1    Dec. 28, 2017

(30) Foreign Application Priority Data

Jun. 27, 2016  (GB) .................................... 1611121

(51) Int. Cl.

| | | |
|---|---|---|
| *G06F 15/173* | (2006.01) | |
| *H04L 12/851* | (2013.01) | |
| *H04W 84/18* | (2009.01) | |
| *H04L 12/911* | (2013.01) | |
| *H04W 28/02* | (2009.01) | |
| *H04W 72/04* | (2009.01) | |

(52) U.S. Cl.
CPC .............. *H04L 47/24* (2013.01); *H04L 47/70* (2013.01); *H04W 84/18* (2013.01); *H04W 28/02* (2013.01); *H04W 72/04* (2013.01)

(58) Field of Classification Search
CPC ................................. H04L 47/24; H04L 47/70
See application file for complete search history.

(56) References Cited

U.S. PATENT DOCUMENTS

| | | |
|---|---|---|
| 2008/0209046 A1 | 8/2008 | Karkanias et al. |
| 2014/0105083 A1 | 4/2014 | Krishnaswamy et al. |

FOREIGN PATENT DOCUMENTS

| | | |
|---|---|---|
| EP | 2 575 323 A1 | 4/2013 |

OTHER PUBLICATIONS

British Patent Application No. GB 1611121.3; Combined Search and Examination Report dated Dec. 5, 2016, 5 pages.

(Continued)

*Primary Examiner* — Hua Fan
(74) *Attorney, Agent, or Firm* — Fitch, Even, Tabin & Flannery LLP

(57) ABSTRACT

A mobile wireless communication unit comprising: at least one short-range wireless circuit and configured to receive content in a bundle format over a delay tolerant network, using a short range wireless communication technology,— wherein the content relates to at least one of multiple quality of service priority levels; a processor operably coupled to the at least one short-range wireless circuit and configured to determine a priority level of the bundle formatted content. In response to the determined priority level, the processor is configured to: transmit at least the bundle formatted content direct to a network server over a cellular network if the determined priority level of the bundle formatted content is high; or store the bundled content in memory coupled to the processor if the determined priority level of the bundle formatted content is low and transmit at least the bundle formatted content to at least one of: another mobile wireless communication unit or a dedicated delay tolerant network gateway node, when discovered using a short range wireless communication technology.

14 Claims, 7 Drawing Sheets

(56) References Cited

OTHER PUBLICATIONS

European Patent Application No. 17174554.0-1215; Communication pursuant to Article 94(3) EPC; dated Oct. 4, 2019; 4 pages.
European Patent Application No. 17174554.0-1857; Extended European Search Report dated Nov. 10, 2017; 6 pages.
European Patent Application No. 17 174 554.0-1215; Communication Pursuant to Article 94(3) dated May 18, 2020, 4 pages.

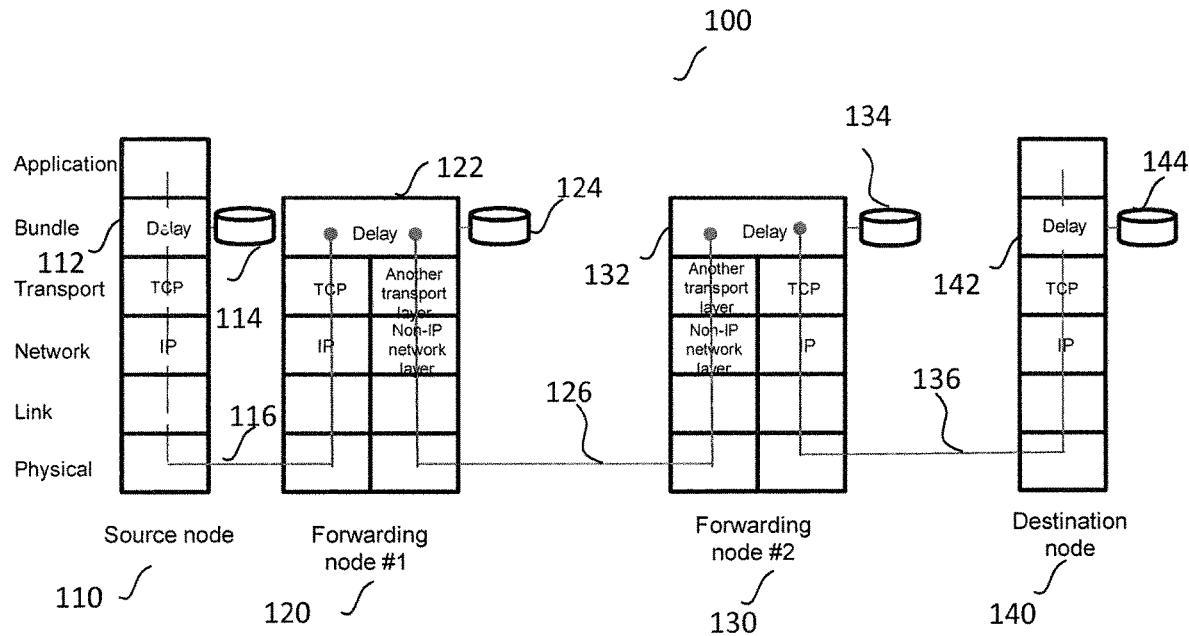
FIG. 1 – Prior art
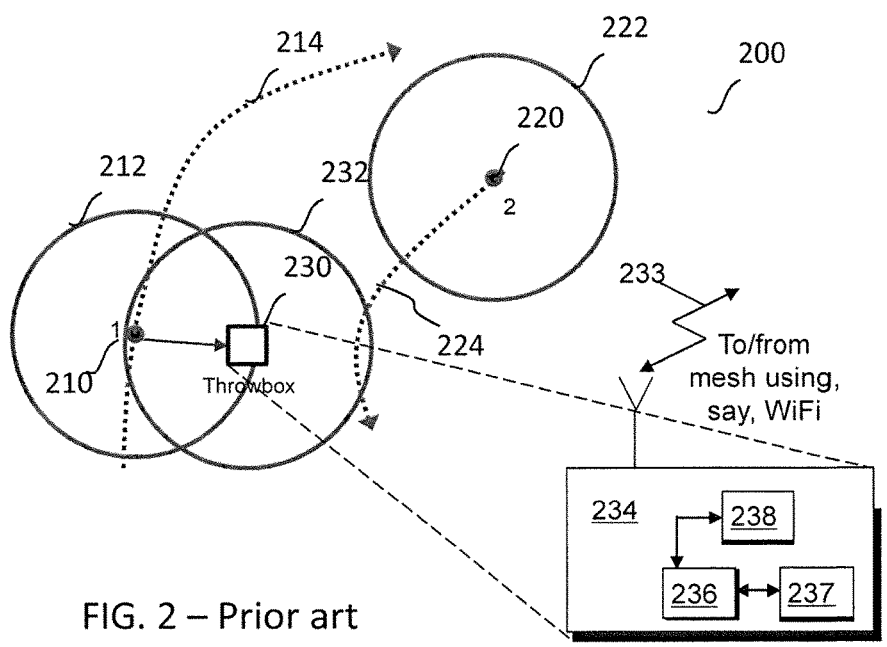
FIG. 2 – Prior art

MOBILE WIRELESS COMMUNICATION UNIT AND METHOD FOR CONTENT TRANSFER

RELATED APPLICATION(S)

This application claims the benefit of United Kingdom Application No. 1611121.3 filed Jun. 27, 2016. The content of this application is fully incorporated herein in its entirety.

TECHNICAL FIELD

The field of this invention relates generally to wireless communication units and methods for uplink routing of content, for example delay tolerant content, within wireless cellular communication systems. In particular, the field of this invention relates to uplink communication based on a priority of the content.

BACKGROUND

A recent development from the third generation (3G) wireless communications is the long term evolution (LTE) cellular communication standard, sometimes referred to as $4^{th}$ generation (4G) systems. Both of these technologies are compliant with third generation partnership project (3GPP™) standards. A conventional mobile cellular network is based on a star topology where the central node, referred to as an eNodeB in 3GPP™ parlance, is the cell site and the other nodes wirelessly connected to the central node are subscriber units, referred to as user equipment (UEs) in 3GPP™ parlance. The connection to the cell site is made via a wireless interface and is possible if the UEs are within wireless coverage of the cell.

When outside of cellular coverage, the network connection is typically lost and the mobile user is unable to access content in a real-time manner, other than via repeater connectivity. It is known that networking with other devices that are also 'off-network' is possible using ad-hoc or peer-to-peer networking methods, this form of networking is normally referred to as 'mesh' networking, which uses a short-range technology such as WiFi™. A directed mesh topology is one where a mesh network exists, but there is at least one sink node that provides real-time connectivity into the network.

A conventional mobile ad hoc network (also called a wireless mesh network) includes a contemporaneous continuous connection between the source and destination nodes. Conventional routing protocols, such as Ad hoc On-Demand Distance Vector (AODV) (see RFC 3561) or OLSR (RFC 3626), can be employed. The AODV routing protocol is intended for use by mobile nodes in an ad hoc network. It offers quick adaptation to dynamic link conditions, low processing and memory overhead, low network utilization, and determines unicast routes to destinations within the ad hoc network.

Another class of wireless network architecture exists where node density is low and/or communication range of the nodes is also low, such that a contemporaneous end to end path does not exist between source and destination nodes. Conventional routing protocols, such as the aforementioned AODV and Optimized Link State Routing (OLSR) will not work. However, this does not mean that packets can never be delivered in such networks. Over time, different links come up and down, due to node mobility, and these sporadic contacts can be exploited to move data closer to its intended target. Such ad hoc networks would typically use only short range communications such as WiFi™ or Bluetooth™, with such schemes using, in effect, a 'store and carry forward' mechanism. Packets are stored and rely on the movement of the mobile node user to carry the data around the network.

Unlike conventional networks nodes, such ad hoc networks cannot be sure whether a contact will occur in the future that will move the packet towards the intended destination. Thus, data packets must be moved to nodes speculatively in the hope that they encounter the destination node, or at least a node closer to the destination. These networks are therefore termed opportunistic networks.

A problem that is prevalent in opportunistic networks is that delivery of packets in an opportunistic network has high, and potentially unbounded latency, and furthermore there is no guarantee that a packet can be ultimately delivered. Conventional transport/network layer protocols like TCP/IP cannot work in such networks where latency is high and unpredictable, as timeouts will occur within these protocols and data will be discarded.

Another technique that is commonly used is to replicate the packet and pass the replica on to any encounter node. This leads to so called 'epidemic routing', where a packet is spread throughout the network until it reaches its intended destination.

The bundle protocol, as defined in RFC 5050 and RFC 4838, was originally developed for space communications. However, it has since been recognised as being applicable to fractured networks, such as those described above. The bundle protocol creates self-contained messages or bundles that are the primary unit of communication. The bundle protocol sits between the application layer and network layer and provides storage functionality to hold bundles until a communication link become available.

FIG. 1 illustrates a layer overview of a known wireless communication system 100 that operates a bundle protocol, whereby one or more low latency links exist between a source node and a destination node when data is passed over one or more forwarding nodes. Using a bundle protocol is key to the operation of delay tolerant networks, as it allows not only transient networks to be connected but also allows different network/transport layers to be used. In transient networks transport control protocol/Internet protocol (TCP/IP) cannot be used in an end-to-end manner, as the communication link times out well before a connection could be made Furthermore, in transient networks, conventional routing protocols will not work either.

In FIG. 1, a low latency link exists between the source node 110 and forwarding node #1 120 and forwarding node #2 130 and destination node 140. Note that conventional transport control protocol/Internet protocol (TCP/IP) can be used between these nodes. Between forwarding node #1 120 and forwarding node #2 130 an intermittent link 126 exists but is also very high latency. Thus, different lower protocol layers are used in this link.

Source node 110 is illustrated as comprising multiple protocol layers, e.g. physical layer, a link layer, a network layer operating with Internet Protocol (IP), a transport layer operating with a Transport Control Protocol (TCP), an application layer and notably a bundle layer 112. When using a bundle protocol layer 112, all the information that is to be sent is bundled in a single data package. This can be stored in store 114 and only transmitted when connectivity to the next bundle hop exists. In this case the bundle is then sent when connectivity 116, 126, 136 becomes available between intermediate nodes in the system, where the intermediate nodes, e.g. forwarding node #1 120 and forwarding node #2 130, may in turn use (or not use) TCP/IP. In order to account for the fact that connectivity 126 and 136 are intermittent, data is delayed and stored at 124 and 134 until this connectivity becomes available.

In this manner, with the use of the bundle protocol, communications is possible within fractured networks, where such networks are termed delay (or disruption) tolerant networks (DTNs), i.e. the repeated introduction of additional delays in delivering the data is deemed acceptable, as the data is delay tolerant.

As previously mentioned low node density results in a lack of contemporaneous end-to-end paths. Increasing the node density by adding special nodes can aggregate traffic within a delay tolerant network, which may improve overall performance. Such special nodes are sometimes referred to as 'throwboxes'.

FIG. 2 illustrates an overview of a wireless communication system 200 comprising block diagram of a known throwbox 234. The known throwbox 234 is similar to other nodes in the network, albeit that it typically also uses low range communications circuitry 238, to transmit or receive 233 short range, e.g. WiFi™ communications, and a memory storage function 236. The known throwbox 234 comprises a controller 237 configured to manage the data in the throwbox 234. For instance, the controller 237 controls transferring data to/from passing communications nodes, such as node #1 210 on path 214 and node #2 passing on path 224. The passing communications nodes may be presented with a list of the available data stored in the throwbox 234 and may be asked to subscribe to, say, a particular communication channel to receive the available data. The controller 237 may also be configured to allow the uploading of data from passing communications nodes too, and then place then in appropriate subscription channels. In this manner, when a passing communications node encounters the throwbox 234 it may upload information onto it or download information from it.

When the wireless communication system 200 of FIG. 2 functions as an opportunistic DTN, data may be propagated through the system using such throwboxes. For example, a passing communication node such as node #1 210 on path 214 encounters the throwbox 234 it may upload information onto it. At a later date a second passing communication node (node #2 220) encounters the throwbox 234 and it queries the throwbox 234 for any data that it might be interested in. In this case the data uploaded from the first communication node (node #1 210) is downloaded. In this example, it is noteworthy that first and second smartphones never encounter each other but data is transferred therebetween through use of the known throwbox 234. Thus, the known throwbox 234 provides a means of increasing the node population and, thus, improving the speed/efficiency of data dissemination, as well as to offer a large store and management function of data.

The inventors of the present invention have identified a need for an improved, more efficient mechanism for routing UL data content, say from sensor nodes to an application server.

SUMMARY OF THE INVENTION

In a first aspect of the invention, a wireless remote communication unit mobile wireless communication unit comprising: at least one short-range wireless circuit and configured to receive content in a bundle format over a delay tolerant network, using a short range wireless communication technology, wherein the content relates to at least one of multiple quality of service priority levels; and a processor operably coupled to the at least one short-range wireless circuit and configured to determine a priority level of the bundle formatted content. In response to the determined priority level, the processor is configured to: transmit at least the bundle formatted content direct to a network server over a cellular network if the determined priority level of the bundle formatted content is high; or store the bundled content in memory coupled to the processor if the determined priority level of the bundle formatted content is low and transmit at least the bundle formatted content to at least one of: another mobile wireless communication unit or a wireless communication unit acting as a dedicated delay tolerant network gateway node, when discovered using a short range wireless communication technology.

In this manner an efficient quality of service functionality is maintained, since high priority data is sent immediately to network servers, while the sending of lower priority data, in the form of DTN bundles, is delayed until a DTN gateway node is reached, where further delay is possible enabling the aggregation of DTN bundles from many sources. In this way efficient QoS functionality is maintained as well as minimizing the number of cellular connections that need to be made, because of the aggregation functionality at the DTN gateway node. In addition having the bulk of DTN data bundle coming from a limited number of nodes, DTN gateway nodes, allows simpler network side functionality.

In an optional example of the invention, the mobile wireless communication unit may be configured to receive multiple bundle formatted content packets from a multiple of wireless nodes. In some examples, the received multiples of bundle formatted content may be stored as individual bundles such that the individual bundles are aggregated and transmitted together to the cellular network node in a single radio resource control connection. In some examples, the mobile wireless communication unit is configured to transmit multiple bundles of bundle formatted content, as received from the multiple wireless nodes, direct to a network server over a cellular network if a determined priority level of one of the bundled contents is high.

In an optional example of the invention, the processor may be configured to determine a known geographic location of at least one wireless communication unit acting as a dedicated delay tolerant network gateway node, and implement a routing protocol based on the geographic location. In some examples, the processor may be configured to implement a routing protocol based on the geographic location of the mobile wireless communication unit and the geographic location of the at least one wireless communication unit acting as a dedicated delay tolerant network gateway node. In some examples, the processor may be configured to implement a routing protocol based on the geographic location and direction of travel of the mobile wireless communication unit and the geographic location of the at least one wireless communication unit acting as a dedicated delay tolerant network gateway node. In some examples, the processor may be configured to implement a routing protocol based on the geographic location and direction of travel of the mobile wireless communication unit, the geographic location of the at least one wireless communication unit acting as a dedicated delay tolerant network gateway node, and a direction of travel of at least one discovered other mobile wireless communication unit.

In an optional example of the invention, the processor may be configured to determine how many bundles are to be transferred to the at least one another mobile wireless communication unit when discovered, and a number of times over a period of time that the at least one another mobile wireless communication unit has directly encountered at least one wireless communication unit acting as a dedicated delay tolerant network gateway node.

In an optional example of the invention, the processor may be configured, upon discovering the at least one another mobile wireless communication unit, to: implement a routing protocol that transfers to the at least one another mobile wireless communication unit at least one of: direction coefficient information, a number of times over a period of time that the mobile wireless communication unit has directly encountered at least one wireless communication unit acting as a dedicated delay tolerant network gateway node; and transfer the stored bundle to the at least one another mobile wireless communication unit in response to determining that the at least one another mobile wireless communication unit is best suited to transport the stored bundle to the wireless communication unit acting as a dedicated delay tolerant network gateway node.

In an optional example of the invention, the received data content may be stored such that all the stored bundles are transmitted to the cellular network node in a single radio resource control connection when the amount of data content exceeds a threshold.

In an optional example of the invention, the memory may be accessed by the processor to identify how many and what specific bundles are stored therein by the use of WiFi discovery prior to WiFi association. In an optional example of the invention, the memory may be accessed by the processor to identify how many and what specific bundles are stored therein by the use of Bluetooth low energy advertising packets.

In an optional example of the invention, the data content may be delay tolerant.

In a second example of the invention, an integrated circuit for a wireless remote communication unit for communicating with a cellular network node and other wireless remote communication units is described. The integrated circuit comprises: at least one short-range wireless circuit and configured to receive content in a bundle format over a delay tolerant network, using a short range wireless communication technology, wherein the content relates to at least one of multiple quality of service priority levels; and a processor operably coupled to the at least one short-range wireless circuit and configured to determine a priority level of the bundle formatted content. In response to the determined priority level, the processor is configured to: transmit at least the bundle formatted content direct to a network server over a cellular network if the determined priority level of the bundle formatted content is high; or store the bundled content in memory coupled to the processor if the determined priority level of the bundle formatted content is low and transmit at least the bundle formatted content to at least one of: another mobile wireless communication unit or a wireless communication unit acting as a dedicated delay tolerant network gateway node, when discovered using a short range wireless communication technology.

In a third example of the invention, a method for routing content comprises, at a mobile wireless communication unit: receiving content in a bundle format over a delay tolerant network, using a short range wireless communication technology, wherein the content relates to at least one of multiple quality of service priority levels; and determining a priority level of the bundle formatted content. In response to the determined priority level, the method further comprises: transmitting at least the bundle formatted content direct to a network server over a cellular network if the determined priority level of the bundle formatted content is high; or storing the bundled content in memory coupled to the processor if the determined priority level of the bundle formatted content is low and transmitting at least the bundle formatted content to at least one of: another mobile wireless communication unit or a wireless communication unit acting as a dedicated delay tolerant network gateway node, when discovered using a short range wireless communication technology.

In a fourth example of the invention, a non-transitory tangible computer program product comprising executable code stored therein for selecting a wireless remote communication unit for configuration as a router in a wireless communication system that comprises multiple wireless remote communication units is described. The code is operable for, when executed at a remote wireless communication unit performing the method of the third aspect.

In a fifth example aspect of the invention, a wireless communication system that comprises a cellular network and at least one mobile wireless communication unit arranged to communicate with one or more wireless nodes one or more other mobile wireless communication units, or a dedicated delay tolerant network gateway node is described. The mobile wireless communication unit is configured in accordance with the first aspect.

BRIEF DESCRIPTION OF THE DRAWINGS

Further details, aspects and embodiments of the invention will be described, by way of example only, with reference to the drawings. In the drawings, like reference numbers are used to identify like, or functionally similar, elements. Elements in the figures are illustrated for simplicity and clarity and have not necessarily been drawn to scale.

FIG. 1 illustrates a layer overview of a known wireless communication system, whereby one or more low latency links exist between a source node and a destination node when data is passed over one or more forwarding nodes.

FIG. 2 illustrates an overview of a known wireless communication system comprising block diagram of a throwbox.

Figure 3:
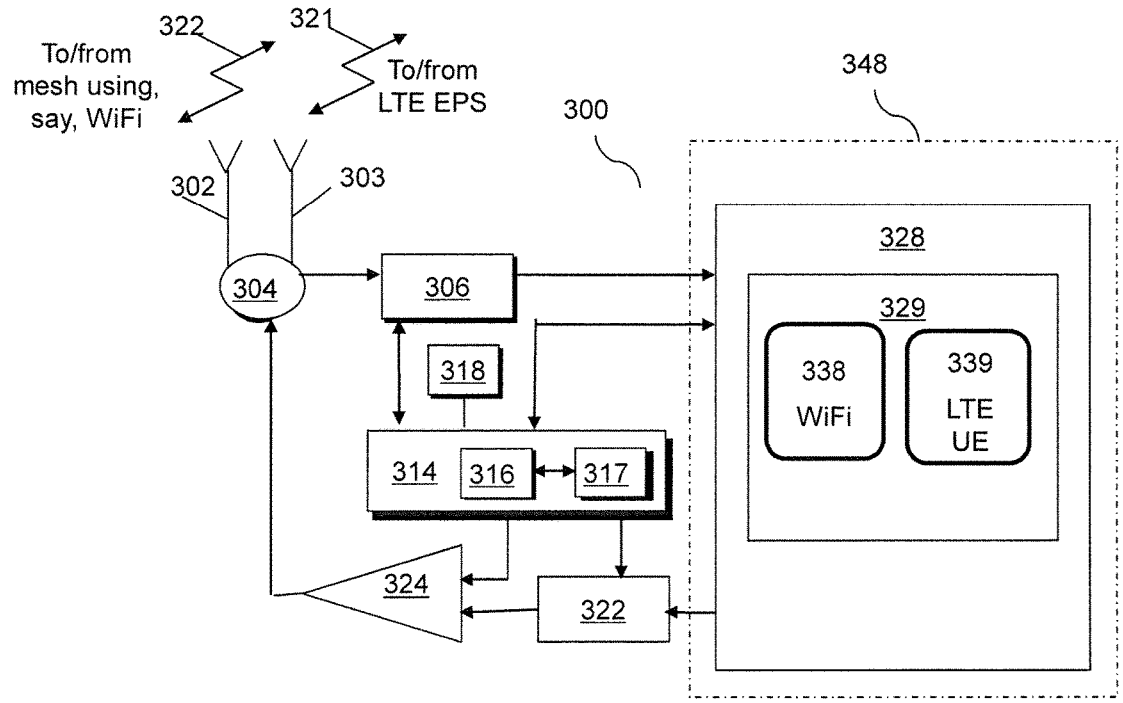
FIG. 3 illustrates an example block diagram of a wireless communication unit such as a dedicated DTN gateway node or a UE, in accordance with some example embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will be further appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Example embodiments of the present invention are described with respect to a wireless communication unit that has some cellular user equipment (UE) functionality and provides WiFi™ connectivity too. In examples of the invention, the wireless communication unit(s) will be described in terms of routing stored data content, received from sensor node that it has passed, to a dedicated node. The dedicated node may be a bundle protocol enabled node that also has continuous connectivity to the network, for example functioning as a gateway between the delay tolerant and conventional networks. This node may be referred to hereafter as a 'dedicated DTN gateway node' (DTN—delay tolerant network). However, it is envisaged that many other wireless communication units can be used to implement the hereinafter described concepts, such as smartphones, so long as they typically have some cellular UE functionality and additionally provide WiFi™ connectivity.

Note that like the throwbox functionality that was described previously, the dedicated DTN gateway node has delay tolerant functionality and short range communication technology, such as WiFi™, but in addition also has cellular connectivity. Thus, an alternative nomenclature for this node is a 'connected throwbox'.

In examples of the invention, the dedicated DTN gateway node may be a stationary device and receives bundles from passing mobile wireless communication units, such as smartphones, that come into WiFi™/802.11 range, even though they and the dedicated DTN gateway node may both be in cellular coverage. Once the data has been passed from the mobile wireless communication unit/smartphone(s) to the dedicated DTN gateway node, the dedicated DTN gateway node may transmit, the previously received multiple bundles of data, preferably delay-tolerant data, for transmission on a cellular bearer. In such a manner, only one bearer resource may be established and used to transfer multiple bundles of data, in contrast to known techniques that use multiple cellular bearers in a wasteful manner.

In other example embodiments, the data content may be prioritized. In such an example, a mobile wireless communication unit such as a smartphone, may determine a priority of the data content and unilaterally send high priority data content to a data network, for example connected to an application server, directly using a cellular connection.

In some examples, the term data content may comprise any form of data, including delay tolerant data (e.g. that is not necessarily to be used or read immediately), data traffic and any other information, in whatever form.

In some examples, a mobile wireless communication unit may be configured to receive data bundles constructed as defined in RFC5050, within or connected to a cellular or IP network, for storing and potentially re-distributing, transmitting or broadcasting, irrespective of whether or not it is located inside or outside of cellular coverage. In some examples, the data content may ultimately be received by a dedicated DTN gateway node using a first (e.g. short-range) technology, such as using a WiFi™ or Bluetooth™ technology, which thereafter potentially re-transmits the data content in an efficient manner using another technology, such as a direct LTE™ bearer.

Referring now to FIG. 3, a block diagram of a wireless communication unit, such as dedicated DTN gateway node 300, adapted in accordance with some example embodiments of the invention, is shown. In accordance with examples embodiments, the dedicated DTN gateway node 300 contains an antenna 303, for receiving/transmitting LTE™ cellular transmissions 321, as well as an antenna 302, for receiving/transmitting short range communications, such as WiFi™ 322. The antennae 302, 303 are coupled to an antenna switch or duplexer 304, which provides isolation between receive and transmit chains within the dedicated DTN gateway node 300, and which may additionally provide isolation between LTE™ and WiFi™ circuitry.

One or more receiver chains, as known in the art, include receiver front-end circuitry 306 (effectively providing reception, filtering and intermediate or base-band frequency conversion). The receiver front-end circuitry 306 is coupled to a signal processor 328 (generally realized by a digital signal processor (DSP)). A skilled artisan will appreciate that the level of integration of receiver circuits or components may be, in some instances, implementation-dependent.

A controller 314 maintains overall operational control of the dedicated DTN gateway node 300. The controller 314 is coupled to the receiver front-end circuitry 306 and the signal processor 328. In some examples, the controller 314 is also coupled to at least one memory, such as random access memory 317 configured to store data content and a memory device 316 that selectively stores operating regimes, such as decoding/encoding functions, synchronization patterns, code sequences, and the like. A timer 318 is operably coupled to the controller 314 to control the timing of operations (e.g. transmission or reception of time-dependent signals) within the dedicated DTN gateway node 300.

As regards the transmit chain, the signal processor 328 may process and formulate data for transmission to transmitter/modulation circuitry 322 and thereafter a power amplifier 324 and on to the antenna 302, 303 antenna array, or plurality of antennas for transmitting the data. The transmitter/modulation circuitry 322 and the power amplifier 324 are operationally responsive to the controller 314.

In accordance with example embodiments, signal processor 328 of dedicated DTN gateway node 300 has been configured to support both WiFi™ and LTE™ operation. In some examples, a signal processor 338 supporting WiFi™ may be implemented as distinct from a signal processor 339 supporting LTE™, as shown. Alternatively, a single processor may be used to support both WiFi™ and LTE™ operation. In some examples, the transmitter and/or receiver circuit may be duplicated, one dedicated for LTE™ operation and one dedicated for WiFi™ operation. Clearly, the various components within the dedicated DTN gateway node 300 can be realized in discrete or integrated component form, with an ultimate structure therefore being an application-specific or design selection.

In accordance with some example embodiments, the receiver 306 of the dedicated DTN gateway node 300 may be configured to receive a data bundles constructed as defined in RFC5050 from at least one (passing) wireless mobile communication unit via antenna 303 over a short range wireless network, such as WiFi™, and route the received data bundles constructed as defined in RFC5050 to at least one short-range wireless circuit, e.g. WiFi processor 338 of a short-range wireless circuit contained within receiver 306 dedicated for WiFi™ reception. WiFi™ processor 338 is configured to receive data bundles constructed as defined in RFC5050 that can be transmitted to a network server. The at least one memory 316, operably coupled to the at least one receiver 306 and/or WiFi™ processor 338, is configured to store the bundle formatted content. The wireless communication unit 300 is configured such that a cellular transmitter, for example LTE™ UE 339, is configured to extract the bundle formatted content from the at least one memory 316 and send the extracted bundle formatted content to the network server over a cellular network, such as LTE™ channel 322 via antenna 302.

Thus, in this example, the data bundles constructed as defined in RFC5050 may be received at the dedicated DTN gateway node 300 using a first technology, e.g. which may be a short range wireless technology such as WiFi™, and ultimately transmitted using a second different technology, e.g. which may be a $3^{rd}$ generation partnership project technology such as LTE™.

In accordance with some example embodiments, the at least one short-range wireless circuit (e.g. WiFi™ processor 338) may be further configured to receive multiple copies of a data bundle as defined in RFC5050 from multiple wireless mobile communication units, and the processor is configured to process the multiple copies of the received data bundle as defined in RFC 5050 and only store one copy of the bundle. The routing protocols that are used in fractured networks typically involve replicating bundles and transferring these to multiple devices within the delay tolerant network. This results in multiple bundles potentially arriving at the dedicated DTN gateway node 300, say from the same sensor node (as will be described later). Therefore, a signal processor at the dedicated DTN gateway node 300 is configured to discard replica bundles, based on, say, a source and destination EID and timestamp. In this manner, dedicated DTN gateway node 300 may ensure that replica bundles are not sent on the cellular link.

In some examples, the bundled content received at dedicated DTN gateway node 300 may relate to at least one of multiple quality of service (QoS) priority levels. In some examples of the invention three QoS classes are considered:

(i) a Bulk class bundle, which can be sent by the dedicated DTN gateway node and can be delayed in the throw-box, for example based on a timer. The bulk class bundle can be sent by the wireless communication unit/UE if there is an expedited class bundle to be sent by the UE.

(ii) A normal class bundle, which can be sent by the dedicated DTN gateway node and are never delayed in this node. The normal class bundle can also be sent by the UEs if there is an expedited class bundle to be sent by the UE.

(iii) An expedited class bundle, which is sent by UEs as soon as they are received.

A processor, such as WiFi™ processor 338, operably coupled to the at least one short-range wireless circuit may be configured to determine a priority level of the bundle formatted content. In response to the determined priority level of the bundle formatted content, the cellular transmitter of dedicated DTN gateway node 300 may be configured to transmit at least the bundle formatted content direct to a network server over a cellular network, for example if the determined priority level of the bundle formatted content is high. In this manner, the dedicated DTN gateway node 300 may immediately establish a RRC connection to send the bundled QoS-based data content. Additionally, all of the low priority (bulk') bundles that are currently waiting may be sent along with the high priority bundled content, or indeed any normal priority bundle.

The at least one memory 316, operably coupled to the at least one receiver 306 and/or WiFi™ processor 338, may be configured to store the received bundle formatted content, particularly when it is delay tolerant and a priority level lower than high.

In some examples, the dedicated DTN gateway node 300 may be configured to receive multiple bundle formatted content packets from multiple wireless nodes, such as sensor nodes, for example via passing smartphones. In some examples, the dedicated DTN gateway node 300 may be configured to transmit multiple bundles of bundle formatted content, as received from passing mobile wireless communication units such as smartphones, direct to a network server over a cellular network if a determined priority level of one of the bundle formatted content is high. In some examples, the received data bundles may be stored, such that multiple bundles can be transmitted to a cellular network node, such as an LTE™ nodeB in a single radio resource control (RRC) connection. Such a transmission may occur when the amount of data content exceeds a threshold, e.g. a threshold related to an amount of data that can readily be sent over single radio resource control connection.

Thus, in some examples, the QoS processing of bundled content within the dedicated DTN gateway node 300 may be combined with an aggregation ability. In some examples, it is beneficial if multiple low priority bundles are collected together before an RRC connection is established by the dedicated DTN gateway node 300, which is then able to provide significant cellular air interface efficiencies by minimising the number of signalling messages required for each bundle to be transmitted. Due to the delay tolerant nature of the bundle protocol operation within a delay tolerant network, it is quite possible to store low priority bundles at the dedicated DTN gateway node 300 in order to create a batch of low priority bundles. Typically these low priority bundles would be associated with the 'bulk' definition defined by the bundle protocol.

The short-range processor 338 of wireless communication unit 300 may be configured to send data to mobile wireless communication units (e.g. smartphones) that discover it. The smartphone may then pass this data to other devices or communication units that it encounters, which can eventually mean that data is passed throughout an opportunistic network, including into and out of cellular coverage devices. In some examples, the relaying of the data content may be focused on delay tolerant data content, such that it can be encapsulated within the bundle protocol and relayed to the application server in a resource efficient manner.

Thus, examples of the invention describe the addition of cellular connectivity to the dedicated DTN gateway node 300 concept in order to create a network where the wireless communication unit that supports both cellular communication and short-range communication (such as WiFi™), e.g. a dedicated DTN gateway node 300, becomes a gateway out of the opportunistic network, based on a use of a bundle protocol. This is in contrast to the known functionality of throwboxes that have no internet connectivity (WiFi™, Ethernet, cellular or otherwise) and only deal with managing contact with other opportunistic devices. In this manner, the wireless communication unit in a form of a dedicated DTN gateway node 300 is configured to act as a gateway between an opportunistic network and a cellular network node, such as an eNodeB, and thereafter to an application server connected to a data network, such as the internet via the cellular connection.

Figure 4:
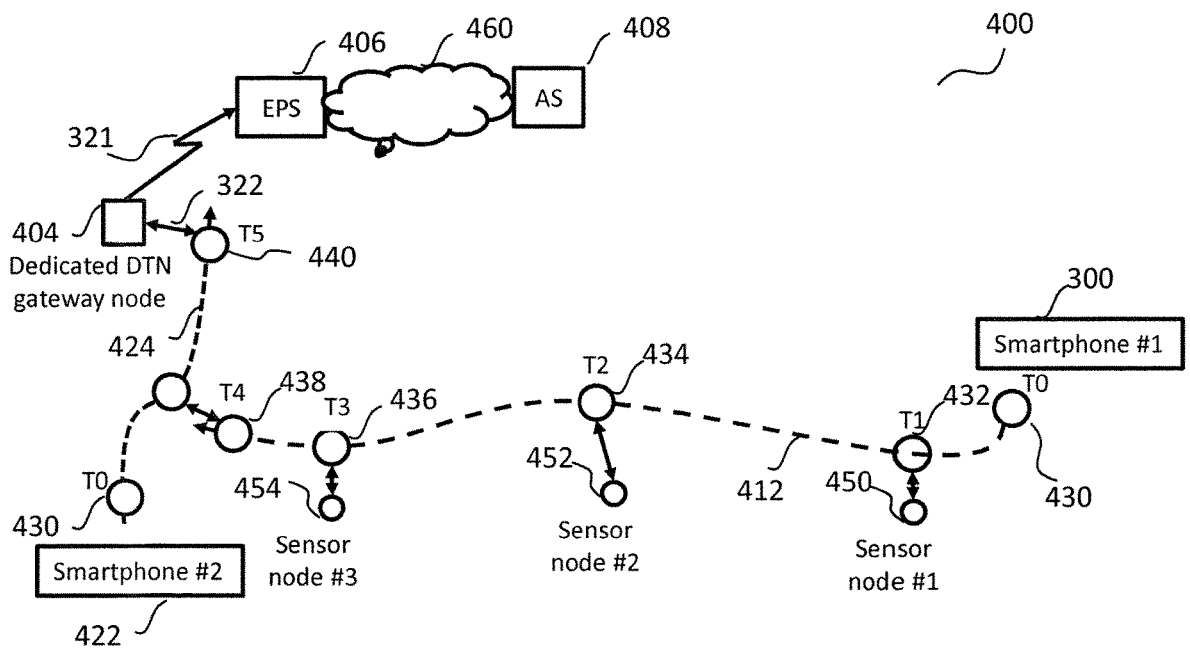
FIG. 4 illustrates an example uplink data path for a set of sensors operational in a wireless communication system, in accordance with some example embodiments of the present invention.

Referring now to FIG. 4, an example uplink data path for a set of sensors operational in a wireless communication system 400 is illustrated, in accordance with some example embodiments of the present invention. In this example, the uplink data is described with reference to data from specific data sources, such as sensor nodes, however in other examples the data and data sources could be any form of delay tolerant data/data sources, where data is sent to a remote data depository, such as an application server (AS) within or coupled to the internet. In this example, the transfer of data or traffic is performed between a particular source and destination.

In this example, a bundle protocol, for example as defined in RFC 5050, is used. In this example, a wireless communication unit 300 is used as the only node that sends DTN bundles from one or more sensor nodes to the internet 460 using a cellular connection. In FIG. 4, the wireless communication unit 300 and mobile wireless communication units, such as first smartphone #1 420, are able to communicate on an LTE™ bearer 121 with an evolved packet system (EPS) 420, which may comprise an eNodeB and thereafter a packet gateway (PGW) and service gateway (SGW) (not shown). The EPS 406 is connected to a public network, such as the Internet 460, supporting Internet Protocol (IP) communication, which in turn is connected to an application server (AS) 410.

In FIG. 4, at time T0 430, a first wireless communication unit, such as smartphone #1 420 is travelling down a path 412. At time T1 432, the smartphone #1 420 discovers a first sensor node #1 450 and receives, over a short-range wireless communication technology 322, such as WiFi™ a first batch of bundled data and stores it in its memory. No attempt is made to use any cellular connectivity that the smartphone #1 420 may have to send the bundle, despite the smartphone #1 420 being within cellular coverage.

Similarly, at time T2 434, the smartphone #1 420 discovers a second sensor node #2 452 and receives, over a short-range wireless communication technology 322, such as WiFi™, a second batch of bundled data and stores the second bundle in memory. Similarly, at time T3 436, a third sensor node #3 454 is discovered and a third bundle #3 464 is received over a short-range wireless communication technology 322, such as WiFi™.

In accordance with examples of the invention, at time T4 438, the smartphone #1 420 enters short-range wireless coverage area of, and discovers, a second smartphone #2 422 travelling along a path 424. Respective bundles of data may be passed there between over a short-range wireless communication technology 322, such as WiFi™. Thus, second smartphone #2 422 now also contains the data uploaded to smartphone #1 420 from first sensor node #1 450, second sensor node #2 452 and third sensor node #3 454.

In some examples, WiFi™ service discovery may be used to indicate what bundles a smartphone has within its memory, and/or to identify if a discovered passing smartphone has bundles on board. Thus, in some examples, an encountering smartphone may compare this data with the data that it stores, and only then actually form a WiFi™ association if it has something that it actually wants or can pass on. The bundles may be ordered in priority (as contacts may be short and therefore needed to be prioritised appropriately). The first bundle(s) that is/are transferred are those that the other user actually wants, then if there is time further bundles that the user has not indicated an interest in may be transferred in the hope of subsequent encounters.

At time T5 440, the smartphone #2 422 enters short-range wireless coverage area of, and discovers, dedicated DTN gateway node 404. Smartphone #2 422 uploads some or all of its stored bundles of data to the dedicated DTN gateway node over a short-range wireless communication technology 322, such as WiFi™.

The dedicated DTN gateway node 404 establishes a RRC connection (if one is not currently established) with the EPS 406 and sends the bundles received from smartphone #2 422 (and also those passed from smartphone #1 to smartphone #2 422), to the EPS 406 using cellular connectivity, such as an LTE bearer 321, and thereafter to the AS 408 via the internet 460.

In this example, it is noteworthy that either, or both, of smartphone #1 and smartphone #2 422 may be in cellular coverage whilst they are collecting data from sensors, such as first sensor node #1 450, second sensor node #2 452 and third sensor node #3 454. However, neither smartphone #1 nor smartphone #2 422 use their cellular connection to send this data. In some examples, the paths of the smartphone may be specific or predetermined, (e.g. via a meter reading technician that employs a 'drive-by' approach), or may be any passing smartphone, for example one that has indicated that it will accept and store data to be uploaded (ultimately) via a dedicated DTN gateway node 404.

Thus, there are only a small number of nodes (e.g. dedicated DTN gateway nodes 300) on which sensor data can arrive from. This allows simpler gateways in the internet, instead of having to route DL data to a large number of potential smartphones a relatively small number of dedicated DTN gateway nodes are used.

In this manner, sending sensor data via the dedicated DTN gateway node 404, offers significant advantages, such as: it allows the dedicated DTN gateway node 404 (and smartphones) to perform aggregation of multiple bundles of data, wherein aggregation of multiple bundles of data is in the sense that as far as the cellular connectivity is concerned the group of bundles are a single piece of data. The dedicated DTN gateway node 404 only sends sensor data when there is a large batch of data to be uploaded to the AS 408 (e.g. readings from multiple sensors). In this regard, the use of a dedicated DTN gateway node 404 in an opportunistic DTN network is suitable for high delay tolerant traffic, whereby additional delay, such as waiting for other sensor data, is not a problem. Furthermore, using batch data provides an advantage that efficient use of the cellular air interface is achieved as only a single RRC connection is required to send large amounts of sensor readings. In addition, in some examples, such data may also be preferably sent at low-cellular usage times of the day, e.g. during the night.

In some examples, a processor and memory in the dedicated DTN gateway node 404 may perform comparison of received data bundles with those stored in memory, to remove any duplicate bundles that may have been received from earlier passing wireless communication units/smartphones. In an opportunistic network replicating data is a common technique to improve routing efficiency, e.g. if there are multiple copies of a bundle propagating through the opportunistic network, the chance that a bundle reaches its intended destination is increased, thereby reducing latency. In some examples described herein, the opportunity to have limited cellular connected nodes allows duplicates to be deleted and only unique bundles are sent to the internet using the cellular connection. However, nodes cannot be certain that this bundle will reach the dedicated DTN gateway node 404, and therefore it sends a copy of the data (or bundle) to multiple smartphones that discover it. Thus, the use of a dedicated DTN gateway node 404 to delete replica bundles that it receives removes the possibility that the same bundle may be uploaded multiple times from multiple passing smartphones as soon as they reach cellular coverage.

Advantageously, the use of the bundle protocol includes a time-to-live indication. This means that bundles are deleted after a fixed time, irrespective of whether or not a particular smartphone's bundle has been passed to a dedicated DTN gateway node 404. Here, the expectation is that at least one other smartphone will have uploaded the bundle to the dedicated DTN gateway node 404. Hence, using dedicated DTN gateway nodes 300 as a gateway node to a cellular network, and ultimately to the internet, allows for efficient routing within the opportunistic network.

Routing within opportunistic networks is difficult, as there is no contemporaneous path from source to destination and since smartphone movements cannot be predicted a probabilistic approach must be taken. The examples described above differ from known techniques that often involve social information, e.g. passing bundles on to nodes that have larger social contacts (e.g. more facebook friends). However, unlike such known approaches, the goal is to reach back to a dedicated DTN gateway node 404, thus a simple measure of the number of times that a node discovers a dedicated DTN gateway node 404 during a defined recent interval is used. In this example, smartphones may pass on a bundle to a discovered smartphone.

Figure 5:
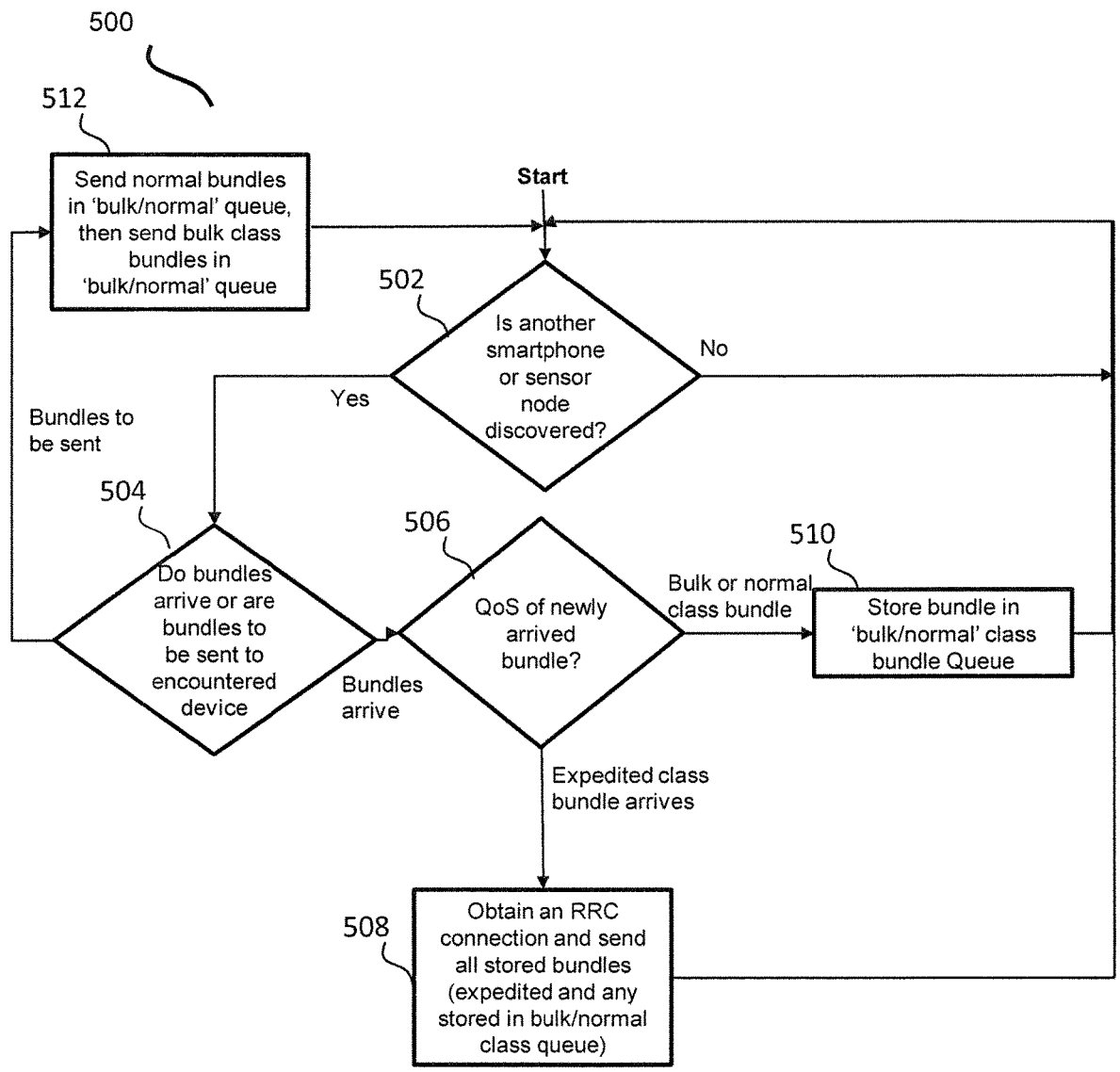
FIG. 5 illustrates an example uplink flowchart of bundling and classifying a quality of service of the bundled data in a wireless communication unit, in accordance with some example embodiments of the present invention.

FIG. 5 illustrates an example uplink flowchart 500 of bundling and classifying a quality of service of the bundled data in a wireless communication unit, in accordance with some example embodiments of the present invention. The example uplink flowchart 500 may be performed by a mobile wireless communication unit, such as a smartphone. The example uplink flowchart 500 starts and moves to 502 whereby a determination is made by the wireless communication unit as to whether another smartphone or sensor node discovered. If the determination in 502 is that another smartphone or sensor node has been discovered, a determination is made as to whether bundles arrive or are bundles to be sent to encountered device in 504. If bundles are to be sent to encountered device in 504, normal bundles are sent in a 'bulk/normal' queue, then bulk class bundles are sent in the 'bulk/normal' queue in 512 and the process loops back to the start accordingly. However, if the determination in 504 is that a bundle of data has arrived, a determination of a Quality of Service of that newly arrived bundle is made in 506. If the determined Quality of Service of that newly arrived bundle is that it is of a normal or bulk class, in 506, then the newly arrived bundle is stored in a bulk/normal class bundle queue in 510. The process then reverts to the start. If the determined Quality of Service of that newly arrived bundle is that it is of an expedited class, in 506, then the wireless communication unit obtains an RRC connection and sends all stored bundles (expedited and any stored in bulk/normal class queue) to the base station, and thereafter the Internet 460 and AS 408 from FIG. 4, in 508. If the determined Quality of Service of that newly arrived bundle in 506 is that it is of a bulk class, the newly arrived bundle is stored in a bulk class bundle queue in 510. The process loops back to the start accordingly.

In this regard, the use of a dedicated DTN gateway node 300 in an opportunistic DTN network is suitable for high delay tolerant traffic, whereby additional delay, such as waiting for other sensor data, is not a problem.

Figure 6:
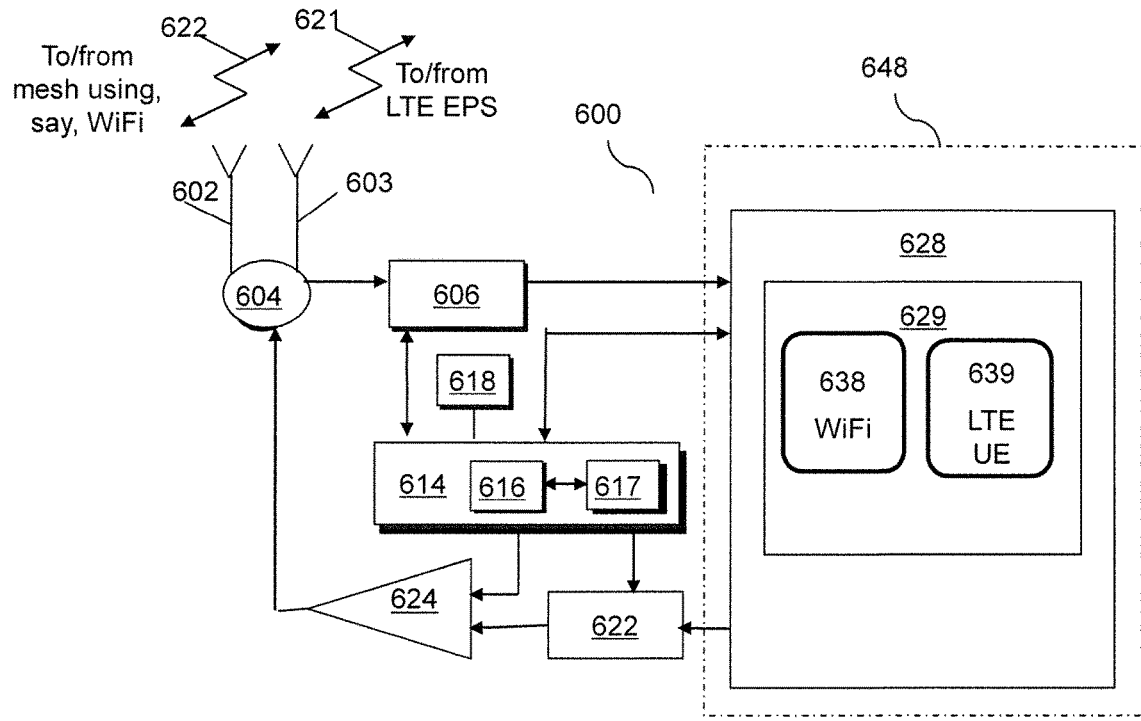
FIG. 6 illustrates an example block diagram of a mobile wireless communication unit, such as a smartphone, adapted in accordance with some example embodiments of the invention.

Referring now to FIG. 6, a block diagram of a wireless communication unit, such as a user equipment (UE), say in the form of a smartphone 600, adapted in accordance with some example embodiments of the invention, is shown. In accordance with examples embodiments, the wireless communication unit contains an antenna 603, for receiving/transmitting LTE™ cellular transmissions 621, as well as an antenna 602, for receiving/transmitting short range communications, such as WiFi™ 622. The antennae 602, 603 are coupled to an antenna switch or duplexer 604, which provides isolation between receive and transmit chains within the wireless communication unit, and which may additionally provide isolation between LTE™ and WiFi™ circuitry.

One or more receiver chains, as known in the art, include receiver front-end circuitry 606 (effectively providing reception, filtering and intermediate or base-band frequency conversion). The receiver front-end circuitry 606 is coupled to a signal processor 628 (generally realized by a digital signal processor (DSP)). A skilled artisan will appreciate that the level of integration of receiver circuits or components may be, in some instances, implementation-dependent.

A controller 614 maintains overall operational control of the wireless communication unit. The controller 614 is coupled to the receiver front-end circuitry 606 and the signal processor 628. In some examples, the controller 614 is also coupled to at least one memory, such as random access memory 617 configured to store data content and a memory device 616 that selectively stores operating regimes, such as decoding/encoding functions, synchronization patterns, code sequences, and the like. A timer 618 is operably coupled to the controller 614 to control the timing of operations (e.g. transmission or reception of time-dependent signals) within the wireless communication unit.

As regards the transmit chain, the signal processor 628 may process and formulate data for transmission to transmitter/modulation circuitry 622 and thereafter a power amplifier 624 and on to the antenna 602, 603 antenna array, or plurality of antennas for transmitting the data. The transmitter/modulation circuitry 622 and the power amplifier 624 are operationally responsive to the controller 614.

In accordance with example embodiments, signal processor 628 of wireless communication unit has been configured to support both WiFi™ and LTE™ operation. In some examples, a signal processor 638 supporting WiFi™ may be implemented as distinct from the signal processor 639 supporting LTE™, as shown. Alternatively, a single processor may be used to support both WiFi™ and LTE™ operation. In some examples, the transmitter and/or receiver circuit may be duplicated, one dedicated for LTE™ operation and one dedicated for WiFi™ operation. Clearly, the various components within the wireless communication unit can be realized in discrete or integrated component form, with an ultimate structure therefore being an application-specific or design selection.

In accordance with some example embodiments, the receiver 606 of the wireless communication unit 300 may be configured to receive data bundles constructed as defined in RFC5050 from one or more wireless communication nodes that it passes, for example a sensor node. The data bundles constructed as defined in RFC5050 is received via antenna 303 over a short range wireless network, such as WiFi™, and the received bundled content is routed to at least one short-range wireless circuit, e.g. WiFi processor 638 of a short-range wireless circuit contained within receiver 606 dedicated for WiFi™ reception. WiFi™ processor 638 is configured to store the received bundled content in at least one memory 616, operably coupled to the at least one receiver 606 and/or WiFi™ processor 638. The wireless communication unit is configured such that a cellular transmitter, for example LTE™ UE 639, may be configured to extract the bundled content from the at least one memory 616 and send the extracted bundled content to a network server over a cellular network using a conventional client server mechanism such as LTE™ channel 322 via antenna 302, if the bundled content is determined to be of a high QoS.

In this example, the data content may be received at the wireless communication unit using a first technology, e.g. which may be a short range wireless technology such as WiFi™, and ultimately transmitted using a second different technology, e.g. which may be a $3^{rd}$ generation partnership project technology such as LTE™.

In accordance with some example embodiments, the at least one short-range wireless circuit (e.g. WiFi™ processor 638) may be further configured to receive data content from multiple wireless (e.g. sensor) nodes, and the processor is configured to process the data bundles constructed as defined in RFC5050 and only store one copy of the data content if it has already received that content from another wireless communication unit, e.g. a sensor sends a first copy to smartphone #1 and a second copy to smartphone #2, and some time later smartphones #1 and #2 meet each other. In accordance with some example embodiments, the at least one short-range wireless circuit (e.g. WiFi™ processor 638) may be further configured to perform aggregation of the received plurality of data content to create at least one formatted bundle of content, e.g. for a particular service, such as related sensor nodes. In some examples, the received data content may be aggregated and stored, such that a bundle is transmitted to a cellular network node, such as LTE™ NodeB in a single radio resource control connection. Such a transmission may occur when the amount of data content exceeds a threshold, e.g. a threshold related to an amount of data that can readily be sent over single radio resource control connection.

In accordance with some example embodiments, the processor may be further configured to manage a status of data content within memory 616, and the at least one short-range wireless circuit 638 may be configured to transmit a message indicating a status of received data content over the short range (WiFi™) wireless network via antenna 603.

The smartphone may then pass this data to other devices or communication units that it encounters, which can eventually mean that data is passed throughout an opportunistic network, including to out-of-cellular coverage devices. In some examples, the relaying of the data content may be focused on delay tolerant data content, such that the bundled data can be relayed to the application server in a resource efficient manner. In some examples, the content may be formed in a bundle, as defined in RFC 5050.

Thus, examples of the invention describe wireless communication unit that determines whether to send received bundles of data content received from wireless nodes that it passes direct to a data network via a cellular communication link, or to a dedicated DTN gateway node functioning as a data store over a short-range communication (such as WiFi™), based on a determined Quality of Service of the received bundle.

It is envisaged that the wireless communication unit (which may be a UE such as a smartphone) may be configured to route delay-tolerant content or non-delay tolerant content, as described later with respect to FIG. 7. In this example, the mobile wireless communication unit (which may be a UE such as a smartphone) comprises: at least one short-range wireless circuit and configured to receive content in a bundled format over a delay tolerant network, using a short range wireless communication technology. Here, the receiver 606 of the mobile wireless communication unit may be configured to receive content from at least one sensor node via antenna 603 over a short range wireless network, such as WiFi™, and route the received content to at least one short-range wireless circuit, e.g. WiFi processor 638 of a short-range wireless circuit contained within receiver 606 dedicated for WiFi™ reception. In this example, the bundled content relates to at least one of multiple quality of service priority levels. A processor, such as WiFi™ processor 638, is operably coupled to the at least one short-range wireless circuit and configured to determine a priority level of the bundle formatted content. A cellular transmitter is configured to transmit at least the bundle formatted content direct to a network server over a cellular network if the determined priority level of the bundle formatted content is high.

In some examples, if the determined priority level of the bundle formatted content is lower than high, the mobile wireless communication unit may be configured to transmit the bundle formatted content to at least one of: another mobile wireless communication unit, a throwbox wireless communication unit. The at least one memory 616, operably coupled to the at least one receiver 606 and/or WiFi™ processor 638, may be configured to store the bundle formatted content, particularly when it is delay tolerant and a priority level lower than high.

In some examples, the mobile wireless communication unit may be configured to receive multiple bundle formatted content packets from multiple wireless nodes, such as sensor nodes. In some examples, the received multiples of bundle formatted content may be aggregated and stored such that a multiple bundles are transmitted to the cellular network node in a single radio resource control connection. In some examples, the mobile wireless communication unit may be configured to transmit multiple bundles of bundle formatted content, as received from the multiple wireless nodes, direct to a network server over a cellular network if a determined priority level of one of the bundle formatted content is high.

Figure 7:
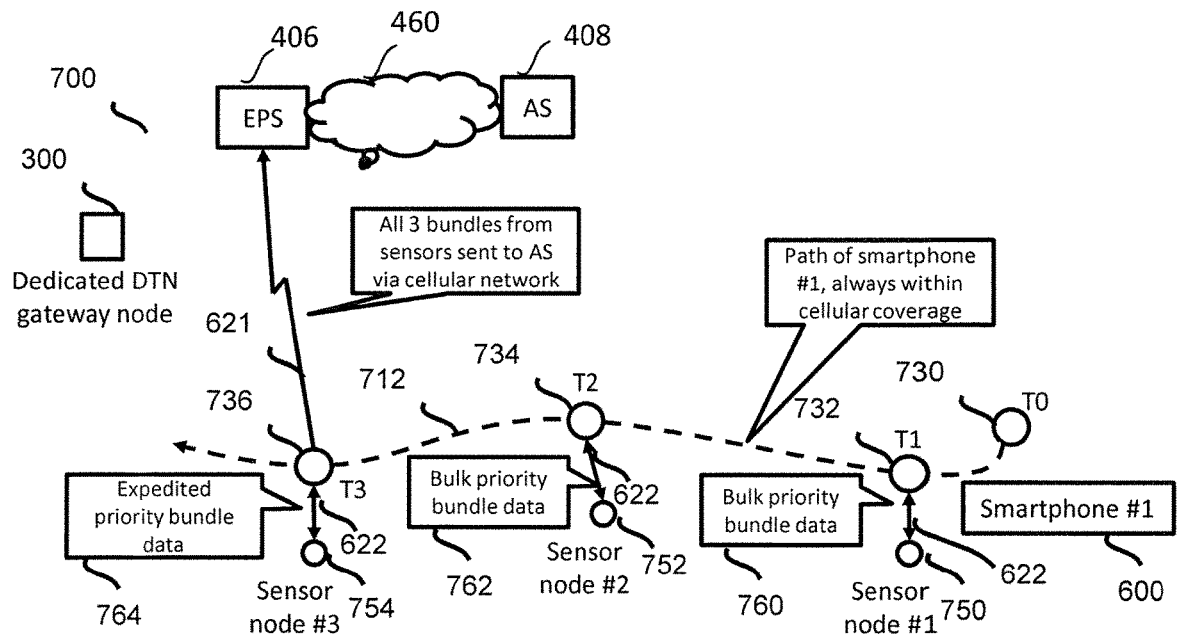
FIG. 7 illustrates an example uplink communication arrangement to support various quality of service data packets in a wireless communication system, in accordance with some example embodiments of the present invention.

Referring now to FIG. 7, an example uplink communication arrangement 700, to support multiple quality of service (QoS) levels for delivery and routing strategies of data packets in a wireless communication system, is illustrated in accordance with some example embodiments of the present invention. In this example, a bundle protocol, for example as defined in RFC 5050, is used. In particular, the bundle protocol contains a protocol field that can take on three possible values: bulk, normal and expedited. Example embodiments of the invention employ such a QoS priority level approach within a dedicated DTN gateway node network, such as that described above with respect to FIG. 4.

In contrast to FIG. 4, where a dedicated DTN gateway node 404 is used as the only node that sends DTN bundles from one or more sensor nodes to the internet 460 using a cellular connection, the example of FIG. 7 enables any sensor node to send DTN bundles of a very high priority to the internet 460 using a cellular connection. Thus, in this example, the behavior explained in FIG. 4 is modified and enhanced in order to provide high priority QoS support. For example, one possible mechanism is to use a cellular connection provided by smartphones, such as an LTE™ bearer 321, to send very high priority data, but may rely on the throwbox 404 for all other priority classes.

In FIG. 7, the throwbox 404 and mobile wireless communication units, such as first smartphone #1 720, are able to communicate on an LTE™ bearer 321 with an evolved packet system (EPS) 406, which may comprise an eNodeB and thereafter a packet gateway (PGW) and service gateway (SGW) (not shown). The EPS 406 is connected to a public network, such as the Internet 460, supporting Internet Protocol (IP) communication, which in turn is connected to an application server (AS) 408.

In FIG. 7, at time T0 730, a first wireless communication unit, such as smartphone #1 600 is travelling down a path 712. At time T1 732, the smartphone #1 600 discovers a first sensor node #1 750 and receives a first low priority (bulk) bundle 660 over a short-range wireless communication technology 622, such as WiFi™. This low priority (bulk) bundle 760 is stored in the smartphone #1 600 and no attempt is made to use any cellular connectivity that the smartphone #1 600 may have to send the bundle, despite the smartphone #1 600 being within cellular coverage.

Similarly, at time T2 734, the smartphone #1 600 receives a second low priority (bulk) bundle 762 over a short-range wireless communication technology 622, such as WiFi™. from sensor node #2 752 and simply stores the second low priority (bulk) bundle 762 and keeps moving without using cellular connectivity.

At time T3 736, however, a third sensor node #3 754 is discovered and a third bundle #3 764 is received that indicates expedited priority. In accordance with examples, the smartphone #1 600 does not continue to use the opportunistic network mechanism to send its collected bundles to the dedicated DTN gateway node 404. In contrast, in this priority-based example, smartphone #1 600 immediately establishes a RRC connection (if one is not currently established) with the EPS 406. Smartphone #1 600 then sends at least the expedited priority third bundle #3 764, and in some examples all stored bundles, to the EPS 406 using cellular connectivity, such as an LTE bearer 621, to the AS 408 via the internet 460.

Figure 8:
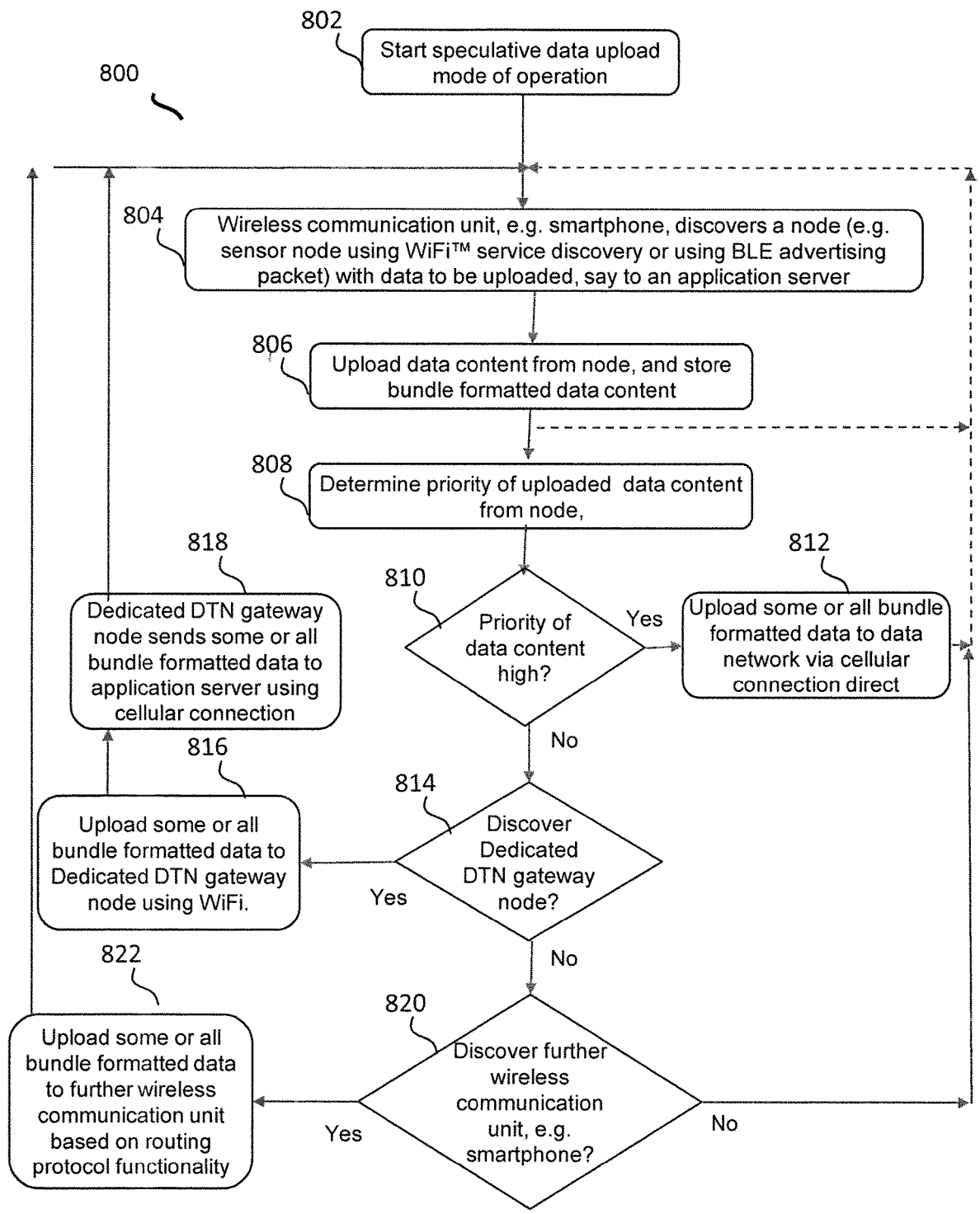
FIG. 8 illustrates an example uplink flowchart of a wireless communication unit, in accordance with some example embodiments of the present invention.

FIG. 8 illustrates an example uplink flowchart 800 of a wireless communication system comprising at least one mobile wireless communication unit, a wireless communication unit such as a throwbox and multiple nodes containing delay tolerant content, in accordance with some example embodiments of the present invention. A skilled artisan will appreciate that the example of an uplink flowchart 800 of a dedicated DTN gateway node 404 or a mobile wireless communication unit represents a simplified overview of some of the functionality of the mobile wireless communication unit(s), and multiple nodes, and other functions and functionalities are envisaged.

The uplink flowchart 800 also illustrates a method for routing content at a mobile wireless communication unit, such as a UE. The method comprises: receiving content in a bundle format over a delay tolerant network, using a short range wireless communication technology, wherein the content relates to at least one of multiple quality of service priority levels; and determining a priority level of the bundle formatted content. In response to the determined priority level, the method further comprises: transmitting at least the bundle formatted content direct to a network server over a cellular network if the determined priority level of the bundle formatted content is high; or storing the bundled content in memory coupled to the processor if the determined priority level of the bundle formatted content is low and transmitting at least the bundle formatted content to at least one of: another mobile wireless communication unit or a wireless communication unit acting as a dedicated delay tolerant network gateway node, when discovered using a short range wireless communication technology.

The example uplink flowchart 800 starts at 802, with one or more of the mobile wireless communication unit(s), wireless communication unit such as a throwbox, and multiple nodes commencing a mode of operation to speculatively upload data to, say, a network server, such as an application server. At 804, a mobile wireless communication unit, e.g. a smartphone, discovers a node (e.g. a sensor node using WiFi™ service discovery) with data to be uploaded, say to an application server. In some alternative examples, it is envisaged that Bluetooth™ LE, may be used, in which case the sensor would send advertising packets. At 806, the data content is uploaded from the node, and the bundle formatted data content stored in the smartphone. The smartphone may then continue to discover other nodes by the flowchart looping back to 804.

At 808, the smartphone determines a priority of the uploaded data content from the node, for example in accordance with the example of FIG. 6. If, in 810, a priority of the uploaded data content is determined as being high, following the concept of FIG. 6, some or all of the uploaded bundled formatted data may be sent from the smartphone to a data network via a direct cellular connection, as in 812. The smartphone may then continue to discover other nodes by the flowchart looping back to 804.

If, in 810, a priority of the uploaded data content is not determined as being high, following the concept of FIG. 6, or a priority-based content approach is not adopted, the flowchart moves on to 814. At 814, the smartphone determines whether it has discovered a wireless communication unit, such as a dedicated DTN gateway node 404 from FIG. 3. If the smartphone has discovered a dedicated DTN gateway node 404, some or all of the uploaded bundled formatted data may be sent from the smartphone to the dedicated DTN gateway node 404, for example using WiFi™, in 816 The dedicated DTN gateway node 404 then establishes a direct cellular connection such as LTE™ to a data network that is coupled to an application server, as in 818 and uploads the bundled formatted data from the one or more nodes, as provided by the smartphone. The smartphone may then continue to discover other nodes by the flowchart looping back to 804.

If the smartphone has not (yet) discovered a dedicated DTN gateway node 404, the smartphone may determine whether it has discovered a further wireless mobile communication unit, such as a second smartphone, in 820. If the smartphone has discovered a second smartphone in 820, some or all of the uploaded bundled formatted data may be sent from the smartphone to the second smartphone, for example using WiFi™, as in 822. One example of the routing protocol available here is described below in relation to FIG. 9. In this manner, the uploaded bundled formatted data from one or multiple nodes may be propagated through the wireless communication system in an opportunistic network manner. Thereafter, the flowchart returns to 804.

An advantage associated with the use of the dedicated DTN gateway node concept, hereinbefore described, is that the nodes always represent the target forwarder node for routing purposes. Thus, the routing used for bundles residing in the mobile devices, such as a smartphone, has a simple goal, namely to locate the nearest dedicated DTN gateway node. In effect the dedicated DTN gateway node becomes the sink node in the DTN, in certain scenarios, such as low QoS bundle scenarios.

In some examples, the location of the various dedicated DTN gateway nodes can readily be provided to smartphones, for example either by using signaling from network servers via their cellular or WiFi™ connections. Alternatively, the location of the various dedicated DTN gateway nodes provided to the mobile devices when they come into contact with the dedicated DTN gateway node itself, and this location information then propagated to other smartphones using the WiFi™ connections that are established when smartphones come into proximity (i.e. when bundles are transferred between smartphones). Once the location of the throwbox is known this can be used in routing protocols used in the fractured network formed by smartphones.

Figure 9:
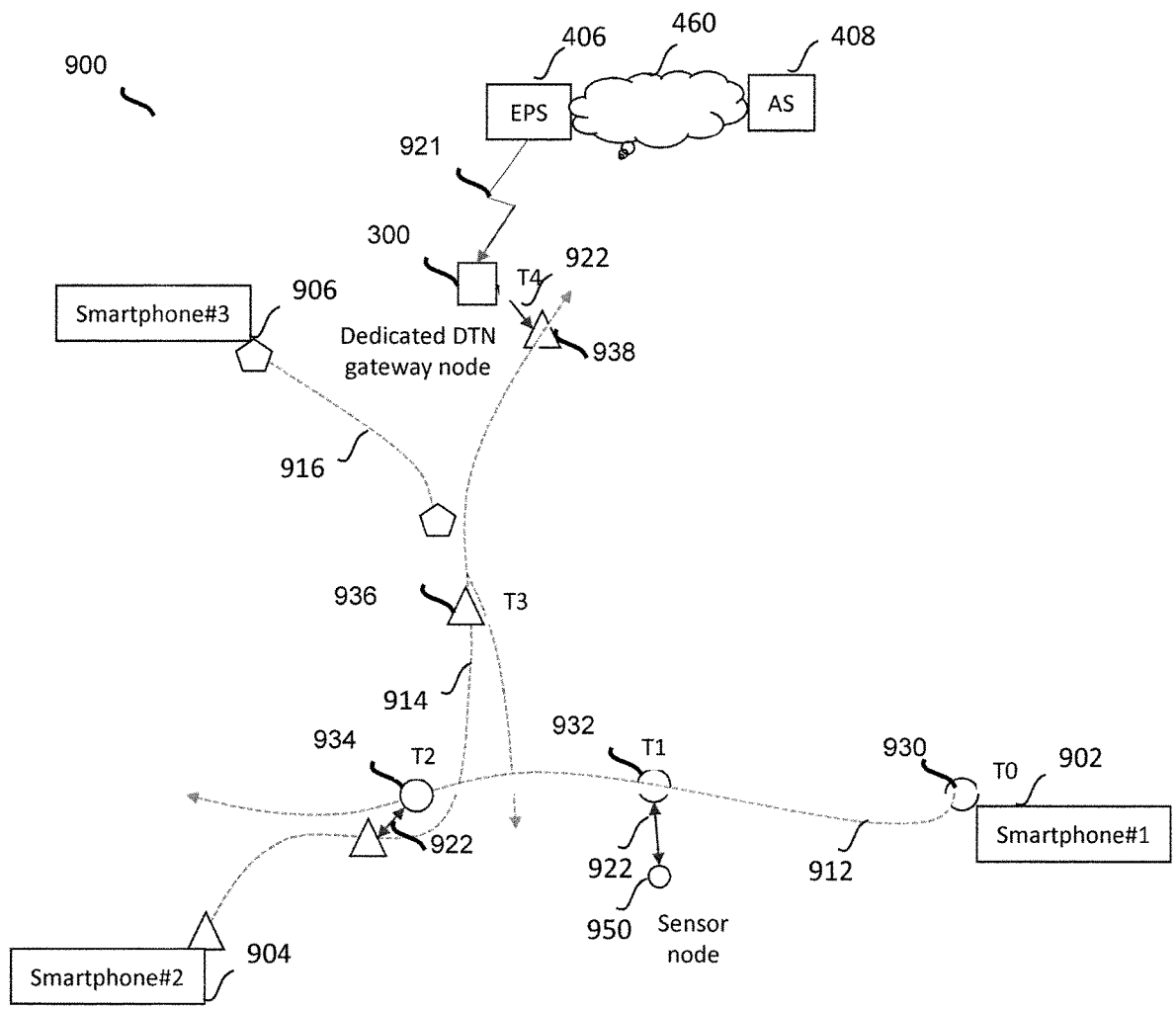
FIG. 9 illustrates an example of a routing protocol that may be used to determine what bundles are transferred between mobile devices, such as smartphones, in accordance with an example of the invention.

One example algorithm that may be employed in the concept of FIG. 9 is a modified form of the well-known 'spray and wait algorithm' (http://chants.cs.ucsb.edu/2005/papers/paper-SpyPso.pdf). The basic known spray and wait algorithm is a simple modification from the epidemic routing algorithm where a fixed number of copies are initially spread by the destination node and then no more copies are made. A further refinement, referred to as a 'binary spray and wait' routing protocol again limits the total number of copies made to a defined value, but also specifies how these copies are replicated. Specifically when a node (e.g. smartphone in some of the previous examples) has 'n' copies residing on it (where n>1) it passes n/2 copies to any other node that it meets.

In contrast to the known spray and wait algorithm' examples of the present invention propose an algorithm to be employed in the mobile devices that modifies this behaviour based on the known location of the throwbox. The proposed example algorithm operates as follows: first each of the mobile devices estimates the current direction of travel of the device (e.g. smartphone), typically using GPS functionality (or other means). Secondly, each of the mobile devices compares its direction of travel to a straight line from the device's current direction to the throwbox. Thirdly, each of the mobile devices then determines a direction coefficient value, for example which may have a range of '−1' to '1' where '−1' indicates moving directly away from throwbox and '1' indicates directly moving towards throwbox. Fourthly, when encountering another smartphone direction coefficients will be swapped and the smartphone with a bundle computes a swap ratio parameter based on the two direction coefficient, to determine which mobile device is best suited to transport the bundle to the dedicated DTN gateway node.

For example, a Swap ratio value=function{direction_coefficient$_{smartphone\ with\ bundle}$, direction_coefficient$_{smartphone\ encountered}$}

In this example, the function may be such that if the direction coefficient of the mobile device that is transporting the bundle is approximately equal to 1 and the direction coefficient for the encountered smartphone is −1 then the swap ratio is '0', as it is highly unlikely that the bundle would have a better chance of reaching the dedicated DTN gateway node based on these parameters. However, if on the other hand the direction coefficient of the mobile device with the bundle is approximately equal to '−1' and the direction coefficient of the encountered smartphone is '1' then the swap ratio='1'. If both of the direction coefficients are approximately the same then the swap ratio is 0.5. Thus, one example of a possible function may therefore be:

$$\text{Swap ratio} = (2 - (\text{direction\_coefficient}_{smartphone\ with\ bundle} - \text{direction\_coefficient}_{smartphone\ encountered}))/4$$

The number of bundles transferred to the encountered mobile device/smartphone is now set to:
round(n*swap ratio).
where n is the number of copies of the bundle on the smartphone; and
where round( . . . ) is the mechanism of rounding up to the nearest integer.

Referring now to FIG. 9, an example of a use of the above routing protocols, for example to determine what bundles (and, for example, how many copies, etc.) are transferred in a wireless communication system 900, is illustrated, in accordance with an example of the invention. In this example, the uplink data is described with reference to data from specific data sources, such as sensor nodes, however in other examples the data and data sources could be any form of delay tolerant data/data sources, where data is sent to a remote data depository, such as an application server (AS) 408 within or coupled to the internet. In this example, the transfer of data or traffic is performed between a particular source and destination.

In this example, a bundle protocol, for example as defined in RFC 5050, is used. In this example, a wireless communication unit/mobile device, such as smartphone 300, is used as a node that is capable of sending DTN bundles from one or more sensor nodes to the internet 460. In FIG. 9, the wireless communication unit 300 such as first smartphone #1 300, is able to communicate on an LTE™ bearer with an evolved packet system (EPS) 406, which may comprise an eNodeB and thereafter a packet gateway (PGW) and service gateway (SGW) (not shown). The EPS 406 is connected to a public network, such as the Internet 460, supporting Internet Protocol (IP) communication, which in turn is connected to an application server (AS) 408. The first smartphone #1 300 is also able to communicate with other wireless communication units/mobile devices using WiFi™.

In some examples, a further alternative or additional routing algorithm is proposed. This further alternative or additional routing algorithm employs a dedicated DTN gateway node discovery based spray and wait process, which may use the aforementioned 'spray and wait' algorithm as a starting point. However, in this example, the approach is used to determine how many bundles are to be transferred and the number of times in the recent past that a smartphone has directly encountered the dedicated DTN gateway node 300. The proposed further alternative or additional example routing algorithm operates as follows: first, whenever each of the mobile devices encounters the dedicated DTN gateway node 300 (for example typically by detecting the appropriate SSID, but noting that other mechanisms may be envisaged) the mobile device increments a counter to record the dedicated DTN gateway node 300 encounter and logs the time at which this encounter took place. Secondly, the number of encounters in the past fixed period, say 24 hours, is determined, and this value is termed a 'rate of throwbox encounters'. Thereafter, whenever a mobile device with a UL sensor bundle encounters another mobile device, the mobile devices will swap their rate of throwbox encounter parameters. From these two parameters a swap ratio may be determined, for example:

Swap ratio=function{rate of throwbox encounters$_{smartphone\ with\ bundle}$, rate of throwbox encounters$_{smartphone\ encountered}$}

This function is such that if the rate of throwbox encounters for a mobile device/smartphone with the bundle is very high compared to the rate of throwbox encounters for an encountered mobile device/smartphone, then the swap ratio is approximately '0'. However, if on the other hand the rate of throwbox encounters for a mobile device/smartphone with the bundle is very low compared to the rate of throwbox encounters for an encountered mobile device/smartphone then the swap ratio is approximately '1'. If the rate of throwbox encounters are approximately the same on both mobile devices/smartphones the swap ratio is '0.5'. Thus, one example implementation for the function could be:

Swap ratio=1−(rate of throwbox encounters$_{smartphone\ with\ bundle}$/(rate of throwbox encounters$_{smartphone\ with\ bundle}$+rate of throwbox encounters$_{smartphone\ encountered}$))

The number of bundles transferred to the encounter smartphone is now set to:
round(n*swap ratio).
where n is the number of copies of the bundle on the smartphone; and
where round( . . . ) is a mechanism of rounding up to the nearest integer.

In FIG. 9, at time T0 930, a first wireless communication unit, such as smartphone #1 902 is travelling down a first path 912. At time T1 932, the smartphone #1 902 discovers a first sensor node #1 950 and receives bundled data, over a short-range wireless communication technology 922, such as WiFi™, and stores it in its memory. No attempt is made to use any cellular connectivity that the smartphone #1 902 may have to send the bundle, despite the smartphone #1 902 potentially being within cellular coverage. In this example, the bundle may indicate that an allowance to make 'N' copies may be performed.

At time T2 934, the smartphone #1 902 discovers a second smartphone #2 904 travelling down a second path 914. As illustrated, both smartphone #1 902 and second smartphone #2 904 are moving in a perpendicular direction to a geographical location of the dedicated DTN gateway node 300. Therefore, in this example, N/2 bundles may be transferred to smartphone #2 904 from smartphone #1 902 over a short-range wireless communication technology 922, such as WiFi™. Smartphone #2 904 then stores the N/2 bundles in memory.

In accordance with examples of the invention, at time T3 936, the smartphone #2 904 enters short-range wireless coverage area of, and discovers, a third smartphone #3 906 travelling along a path 916. Respective bundles of data may be passed there between over a short-range wireless communication technology 322, such as WiFi™. However, in this example, both smartphones are running one or both of the aforementioned routing protocol algorithms. In this case, following a transfer of the date relating to the number of bundles and a geographical direction of travel of the respective smartphones, where it is determined that Smartphone #2 904 is moving towards dedicated DTN gateway node 300 whereas smartphone #3 906 is moving away from dedicated DTN gateway node 300. Thus no copies of bundles are transferred between Smartphone #2 904 and third smartphone #3 906.

Thereafter, at time T4 938, the smartphone #2 904 enters short-range wireless coverage area of, and discovers, dedicated DTN gateway node 300. Smartphone #2 904 uploads some or all of its stored bundles of data, including the N/2 bundles that it received from smartphone #1 902, to the dedicated DTN gateway node 300 over a short-range wireless communication technology 922, such as WiFi™.

The dedicated DTN gateway node 300 establishes a RRC connection (if one is not currently established) with the EPS 406 and sends the bundles received from smartphone #2 904 (and also those N/2 bundles passed from smartphone #1 902 to smartphone #2 904), to the EPS 406 using cellular connectivity, such as an LTE bearer 921, and thereafter to the AS 408 via the internet 460.

In this manner, sending sensor data via the dedicated DTN gateway node 300, offers significant advantages, such as: it allows the dedicated DTN gateway node 300 (and smartphones) to perform aggregation of multiple bundles of data. The dedicated DTN gateway node 300 only sends sensor data when there is a large batch of data to be uploaded to the AS 408 (e.g. readings from multiple sensors). Furthermore, using batch data provides an advantage that efficient use of the cellular air interface is achieved as only a single RRC connection is required to send large amounts of sensor readings. In addition, in some examples, such data may also be preferably sent at low-cellular usage times of the day, e.g. during the night.

Figure 10:
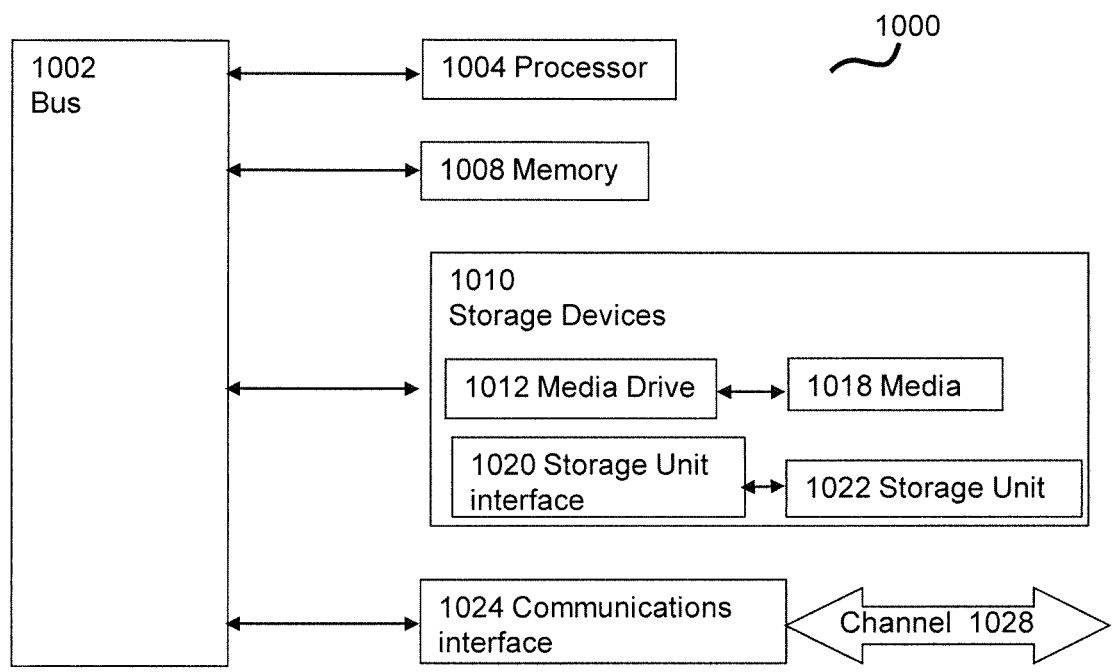
FIG. 10 illustrates a typical computing system that may be employed a wireless communication unit to perform an enforcement role in accordance with some example embodiments of the invention.

Referring now to FIG. 10, there is illustrated a typical computing system 1000 that may be employed to implement routing of content or delay tolerant content from wireless nodes, such as sensor nodes to an application server in some example embodiments of the invention. Computing systems of this type may be used in wireless communication units. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special-purpose processing engine such as, for example, a microprocessor, microcontroller or other control logic. In this example, processor 1004 is connected to a bus 1002 or other communications medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory (ROM) or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1018 may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having particular computer software or data stored therein.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a universal serial bus (USB) port), a PCMCIA slot and card, etc. Software and data transferred via communications interface 1024 are in the form of signals which can be electronic, electromagnetic, and optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 1008, storage device 1018, or storage unit 1022. These and other forms of computer-readable media may store one or more instructions for use by processor 1004, to cause the processor to perform specified operations. Such instructions, generally referred to as 'computer program code' (which may be grouped in the form of computer programs or other groupings), when executed, enable the computing system 1000 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1022, drive 1012 or communications interface 1024. The control logic (in this example, software instructions or computer program code), when executed by the processor 1004, causes the processor 1004 to perform the functions of the invention as described herein.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

In one example of an integrated circuit, the integrated circuit may be suitable for a mobile wireless communication unit, such as UE that is capable of cellular (e.g. LTE™) and short-range wireless communications (such as WiFi™). In this second example, the integrated circuit comprises: at least one short-range wireless circuit and configured to receive content in a bundle format over a delay tolerant network, using a short range wireless communication technology, wherein the content relates to at least one of multiple quality of service priority levels; a processor operably coupled to the at least one short-range wireless circuit and configured to determine a priority level of the bundle formatted content. In response to the determined priority level, the processor is configured to: transmit at least the bundle formatted content direct to a network server over a cellular network if the determined priority level of the bundle formatted content is high; or store the bundled content in memory coupled to the processor if the determined priority level of the bundle formatted content is low and transmit at least the bundle formatted content to at least one of: another mobile wireless communication unit or a wireless communication unit acting as a dedicated delay tolerant network gateway node, when discovered using a short range wireless communication technology.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

We claim:

1. A mobile wireless communication unit comprising:
   at least one short-range wireless circuit configured to receive bundle messages from any of a plurality of wireless nodes over a delay tolerant network; using a short range wireless communication technology, wherein each received bundle message comprises bundle formatted content and has a corresponding quality of service priority level;
   a processor operably coupled to the at least one short-range wireless circuit and configured to determine the quality of service priority level of each received bundle message as being one of at least: a first quality of service priority level or a second quality of service priority level, where the first quality of service priority level is a more important quality of service priority level than the second quality of service priority level;
   a memory coupled to the processor:
   wherein the processor is configured to:
   create a first group of a plurality of the received bundle messages when the determined quality of service priority level of each of the received bundle messages is the first quality of service priority level, and transmit the first group of received bundle messages to a network server over a cellular network in a single radio resource control connection;
   create a second group of a plurality of the received bundle messages when the determined quality of service priority level of at least one of the received bundle messages is the first quality of service priority level and wherein the determined quality of service priority level of at least another one of the received bundle messages is the second quality of service priority level and transmit the second group of the plurality of the received bundle messages with any stored received bundle messages of the second quality of service priority level to a network server over a cellular network in a single radio resource control connection; and
   create a third group of a plurality of the received bundle messages when the determined quality of service priority level of each of the received bundle messages is the second quality of service priority level, store the third group of the plurality of the received bundle messages in the memory as individual bundles of received bundle messages from respective wireless nodes, and subsequently transmit the third group of stored individual bundles of the plurality of the received bundle messages from multiple wireless nodes as an aggregated group in a single radio resource control connection to at least one of: another mobile wireless communication unit or a wireless communication unit acting as a dedicated delay tolerant network gateway node, that uses the short range wireless communication technology.

2. The mobile wireless communication unit of claim 1 wherein the processor is configured to determine a known geographic location of at least one wireless communication unit acting as a dedicated delay tolerant network gateway node, and implement a routing protocol based on the geographic location.

3. The mobile wireless communication unit of claim 2 wherein the processor is configured to implement the routing protocol based on a geographic location of the mobile wireless communication unit and the geographic location of the at least one wireless communication unit acting as a dedicated delay tolerant network gateway node.

4. The mobile wireless communication unit of claim 2 wherein the processor is configured to implement the routing protocol based on a geographic location and direction of travel of the mobile wireless communication unit and the geographic location of the at least one wireless communication unit acting as a dedicated delay tolerant network gateway node.

5. The mobile wireless communication unit of claim 2 wherein the processor is configured to implement the routing protocol based on a geographic location and direction of travel of the mobile wireless communication unit, the geographic location of the at least one wireless communication unit acting as a dedicated delay tolerant network gateway node, and a direction of travel of at least one discovered other mobile wireless communication unit.

6. The mobile wireless communication unit of claim 2 wherein the processor is configured, to implement the routing protocol to transfer to the at least one another mobile wireless communication unit at least one of: direction coefficient information, a number of times over a period of time that the mobile wireless communication unit has directly encountered at least one wireless communication unit acting as a dedicated delay tolerant network gateway node and transmit the third group of the stored individual bundles of the plurality of the received bundle messages to the at least one another mobile wireless communication unit in response thereto.

7. The mobile wireless communication unit of claim 1 wherein the processor is further configured to transmit each of the third group of the stored individual bundles of the plurality of the received bundle messages in response to a determination of a number of received message bundles that are to be transferred to the at least one another mobile wireless communication unit, and a number of times that the at least one another mobile wireless communication unit has directly encountered at least one wireless communication unit acting as a dedicated delay tolerant network gateway node.

8. The mobile wireless communication unit of claim 1 wherein the third group of stored individual bundles of the plurality of the received bundle messages is stored such that the stored received bundle messages are transmitted to the cellular network node in the single radio resource control connection when the amount of received bundle messages exceeds a threshold.

9. The mobile wireless communication unit of claim 1 wherein the memory is accessed by the processor to identify how many and what specific received bundle messages are stored therein by the use of WiFi™ discovery prior to WiFi™ association.

10. The mobile wireless communication unit of claim 1 wherein the memory is accessed by the processor to identify how many and what specific received bundle messages are stored therein by the use of Bluetooth low energy advertising packets.

11. The mobile wireless communication unit of claim 1 wherein the transmitted group of the plurality of the received bundle messages is delay tolerant.

12. An integrated circuit for a mobile wireless communication unit, the integrated circuit comprising:
at least one short-range wireless circuit and configured to receive bundle messages that each comprise bundle formatted content from any of a plurality of wireless nodes over a delay tolerant network, using a short range wireless communication technology, wherein each received bundle message has a corresponding quality of service priority level;
a processor operably coupled to the at least one short-range wireless circuit and configured to determine the quality of service priority level of each received bundle message as being one of at least: a first quality of service priority level or a second quality of service priority level, where the first quality of service priority level is a more important quality of service priority level than the second quality of service priority level;
wherein in response to the determined quality of service priority level, the processor is configured to:
create a first group of a plurality of the received bundle messages when the determined quality of service priority level of each of the received bundle messages is the first quality of service priority level, and transmit the first group of received bundle messages to a network server over a cellular network in a single radio resource control connection;
create a second group of a plurality of the received bundle messages when the determined quality of service priority level of at least one of the received bundle messages is the first quality of service priority level and wherein the determined quality of service priority level of at least another one of the received bundle messages is the second quality of service priority level and transmit the second group of the plurality of the received bundle messages with any stored received bundle messages of the second quality of service priority level to a network server over a cellular network in a single radio resource control connection; and
create a third group of a plurality of the received bundle messages when the determined quality of service priority level of each of the received bundle messages is the second quality of service priority level, store each of the third group of the plurality of the received bundle messages in the memory as individual bundles of received bundle messages from respective wireless nodes, and subsequently transmit the third group of stored individual bundles of the plurality of the received bundle messages from multiple wireless nodes as an aggregated group in a single radio resource control connection to at least one of: another mobile wireless communication unit or a wireless communication unit acting as a dedicated delay tolerant network gateway node that uses the short range wireless communication technology.

13. A method for routing received message bundles content, the method comprising, at a mobile wireless communication unit:
receiving bundle messages that each comprise bundle formatted content from any of a plurality of wireless nodes over a delay tolerant network, using a short range wireless communication technology, wherein each received bundle message has a corresponding quality of service priority level;
determining a quality of service priority level of each received bundle message as being one of at least: a first quality of service priority level or a second quality of service priority level, where the first quality of service priority level is a more important quality of service priority level than the second quality of service priority level;
creating a first group of a plurality of the received bundle messages when the determined quality of service priority level of each of the received bundle messages is the first quality of service priority level, and transmitting the first group of received bundle messages to a network server over a cellular network in a single radio resource control connection; and
creating a second group of a plurality of the received bundle messages when the determined quality of service priority level of at least one of the received bundle messages is the first quality of service priority level and wherein the determined quality of service priority level of at least another one of the received bundle messages is the second quality of service priority level and transmit the second group of the plurality of the received bundle messages with any stored received bundle messages of the second quality of service priority level to a network server over a cellular network in a single radio resource control connection; and
creating a third group of a plurality of the received bundle messages when the determined quality of service priority level of each of the received bundle messages is the second quality of service priority level, storing each the third group of the plurality of the received bundle messages in memory as individual bundles of received bundle messages from respective wireless nodes, and subsequently transmitting the third group of stored individual bundles of the plurality of the received bundle messages from multiple wireless nodes as an aggregated group in a single radio resource control connection to at least one of: another mobile wireless communication unit or a wireless communication unit acting as a dedicated delay tolerant network gateway node that uses the short range wireless communication technology.

14. A wireless communication system that comprises a cellular network and at least one mobile wireless communication unit arranged to communicate with one or more wireless nodes, one or more other mobile wireless communication units, or a dedicated delay tolerant network gateway node, the mobile wireless communication unit comprising:
at least one short-range wireless circuit configured to receive bundle messages that each comprise bundle formatted content from any of a plurality of wireless nodes over a delay tolerant network, using a short range wireless communication technology, wherein each received bundle message has a corresponding quality of service priority level;

a processor operably coupled to the at least one short-range wireless circuit and configured to determine a quality of service priority level of each received bundle message as being one of at least: a first quality of service priority level or a second quality of service priority level, where the first quality of service priority level is a more important quality of service priority level than the second quality of service priority level;

a memory coupled to the processor;

wherein the processor is configured to:

create a first group of a plurality of the received bundle messages when the determined quality of service priority level of each of the received bundle messages is the first quality of service priority level, and transmit the first group of received bundle messages to a network server over a cellular network in a single radio resource control, RRC, connection;

create a second group of a plurality of the received bundle messages when the determined quality of service priority level of at least one of the received bundle messages is the first quality of service priority level and wherein the determined quality of service priority level of at least another one of the received bundle messages is the second quality of service priority level and transmit the second group of the plurality of the received bundle messages with any stored received bundle messages of the second quality of service priority level to a network server over a cellular network in a single radio resource control connection; and create a third group of a plurality of the received bundle messages when the determined quality of service priority level of each of the received bundle messages is the second quality of service priority level, store the third group of the plurality of the received bundle messages in the memory as individual bundles of received bundle messages from respective wireless nodes, and subsequently transmit the third group of stored individual bundles of the plurality of the received bundle messages from multiple wireless nodes as an aggregated group in a single radio resource control connection to at least one of: another mobile wireless communication unit or a wireless communication unit acting as a dedicated delay tolerant network gateway node that uses the short range wireless communication technology.

* * * * *